(12) United States Patent  (10) Patent No.: US 8,504,240 B2
Otake  (45) Date of Patent: Aug. 6, 2013

(54) ALTERNATOR CONTROLLING APPARATUS

(75) Inventor: Hirotada Otake, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 509 days.

(21) Appl. No.: 12/863,676

(22) PCT Filed: Jan. 29, 2009

(86) PCT No.: PCT/JP2009/051502
§ 371 (c)(1),
(2), (4) Date: Jul. 20, 2010

(87) PCT Pub. No.: WO2009/096489
PCT Pub. Date: Aug. 6, 2009

(65) Prior Publication Data
US 2010/0289460 A1  Nov. 18, 2010

(30) Foreign Application Priority Data
Jan. 31, 2008 (JP) .................. 2008-021817

(51) Int. Cl.
H02P 9/00 (2006.01)
B60B 23/00 (2006.01)
B62C 3/00 (2006.01)
B62K 25/00 (2006.01)

(52) U.S. Cl.
USPC ............................ 701/40; 701/38

(58) Field of Classification Search
USPC ........ 322/44, 89, 20; 701/22, 40, 38; 320/109
See application file for complete search history.

(56) References Cited

U.S. PATENT DOCUMENTS

| 5,332,927 | A | * | 7/1994 | Paul et al. | 307/66 |
| 5,430,647 | A | * | 7/1995 | Raad et al. | 701/38 |
| 6,694,225 | B2 | * | 2/2004 | Aga et al. | 701/1 |
| 2004/0093144 | A1 | * | 5/2004 | Ishizu et al. | 701/93 |
| 2006/0271257 | A1 | | 11/2006 | Kuroda et al. | |
| 2007/0210763 | A1 | * | 9/2007 | Aoyama | 322/28 |
| 2008/0172155 | A1 | | 7/2008 | Takamatsu et al. | |
| 2008/0297113 | A1 | * | 12/2008 | Saeki et al. | 320/128 |

FOREIGN PATENT DOCUMENTS

| JP | 11 22504 | 1/1999 |
| JP | 2006 94624 | 4/2006 |
| JP | 2006 298293 | 11/2006 |
| JP | 2006 335097 | 12/2006 |
| JP | 2006 347254 | 12/2006 |
| JP | 2008 100590 | 5/2008 |
| JP | 2008 231989 | 10/2008 |

* cited by examiner

Primary Examiner — Julio C. Gonzalez
(74) Attorney, Agent, or Firm — Oblon, Spivak, McClelland, Maier & Neustadt, L.L.P.

(57) ABSTRACT

Provided is an alternator controller that sets a target current value based on a target voltage as a control reference of an alternator mounted on a vehicle, and controls the alternator based on the set target current value. The alternator controller includes a filter processing unit that performs filter processing of a target power generation torque as a conversion physical amount used until the target current value is set from the target voltage. The filter processing unit performs a filter processing that attenuates or removes a frequency component f of the pitch resonance frequency of the vehicle among the waveforms of the target power generation torque. Thus, it is possible to surely suppress fluctuations of a vehicle behavior attributed to torque fluctuations of an alternator load torque.

12 Claims, 8 Drawing Sheets

FIG.3

| | UNDER DECELERATION | UNDER CONSTANT TRAVEL | UNDER ACCELERATION |
|---|---|---|---|
| CHARGE STATUS HIGH (A>B) | V*=MID | V*=LOW | V*=LOW |
| CHARGE STATUS MIDIUM (B>A>C) | V*=HIGH | V*=MID | V*=LOW |
| CHARGE STATUS LOW (C>A) | V*=HIGH | V*=HIGH | V*=MID |

A: SOC VALUE
B: THRESHOLD VALUE
C: THRESHOLD VALUE (B>C)

FIG.4

| | HEADLIGHT IS TURNED OFF AND WIPER IS TURNED OFF | HEADLIGHT IS TURNED ON OR WIPER IS TURNED ON |
|---|---|---|
| SPORTS MODE | VA=12.5 | VA=12.5 |
| NORMAL MODE | VA=12.5 | VA=13.0 |
| ECO MODE | VA=13.0 | VA=13.0 |

| SPORTS MODE | VB=14.5 |
|---|---|
| NORMAL MODE | VB=14.5 |
| ECO MODE | VB=14.5 |

ALTERNATOR CONTROLLING APPARATUS

TECHNICAL FIELD

The present invention relates to an alternator controlling apparatus, and more particularly, relates to the alternator controlling apparatus for setting a control amount based on a reference physical amount as a control reference of an alternator mounted on a vehicle and controlling the alternator based on the set control amount.

BACKGROUND ART

The alternator mounted on the vehicle generally generates power by an engine torque generated by an engine. That is to say, power generation of the alternator becomes a load when the engine operates. Therefore, an alternator load torque generated by the power generation of the alternator acts on the vehicle. Herein, the alternator is connected to a battery mounted on the vehicle. Therefore, the battery is charged by the power generation of the alternator. In general, charge control to charge the battery is performed by control of the alternator by the alternator controlling apparatus.

Herein, devices such as a wiper, a headlight, electric power steering (EPS) and a variable gear ratio steering (VGRS) mounted on the vehicle are connected to the battery as an electrical load. The electrical load fluctuates by operation of the devices and a voltage in an electric system of the vehicle including the battery and the electrical load fluctuates. Especially, when the electric power steering (EPS) and the variable gear ratio steering (VGRS) operate, the electrical load largely fluctuates and the voltage in the electric system of the vehicle tends to fluctuate largely. In the alternator controlling apparatus, a target power generation current value of the alternator as the control amount is set based on deviation between the battery voltage and the target voltage being the reference physical amount as the control reference of the alternator, and the power generation current of the alternator is changed. Therefore, the power generation torque of the alternator, that is to say, the alternator load torque relative to the engine fluctuates by the fluctuation of the electrical load.

Therefore, the conventional technique to suppress the fluctuation of the alternator load torque is suggested. For example, the Patent Document 1 discloses to balance out decrease in an alternator drive torque (alternator load torque) by increase in generation torque of the engine (engine torque) by fuel injection from fuel cutoff during deceleration. That is to say, the Patent Document 1 discloses the technique to balance out the fluctuation of the alternator load torque by the engine torque. Also, as in the Patent Document 2, the technique to control an auxiliary machine with delay in consideration of delay in engine response in order to suppress the fluctuation of the engine torque by fluctuation of an auxiliary machine drive torque is disclosed. Also, as disclosed in the Patent Documents 3 and 4, there is the alternator load torque disclosed in the Patent Document 2. The technique to suppress vibration by controlling target drive force is also disclosed.

Patent Document 1: Japanese Patent Application Laid-open No. 2006-94624
Patent Document 2: Japanese Patent Application Laid-open No. 2006-335097
Patent Document 3: Japanese Patent Application Laid-open No. 2006-298293
Patent Document 4: Japanese Patent Application Laid-open No. 2006-347254

DISCLOSURE OF INVENTION

Problem to be Solved by the Invention

Since the engine torque fluctuates by the fluctuation of the alternator load torque, vehicle behavior tends to vary. Although the fluctuation of the alternator load torque is balanced out by the engine torque in the Patent Document 1, an object of the engine is to generate a large engine torque, so that there is a problem in accuracy when balancing out the fluctuation of the load torque smaller than the engine torque. There is also a problem in responsibility until the required engine torque is generated.

Although it may also be considered to control the variation of the alternator load torque so as to simply suppress the variation in the vehicle behavior, in this case, the fluctuation of the voltage in the electric system of the vehicle cannot be suppressed and there is a problem that an operating situation of the device being the electrical load varies. There also is a problem that durability of the battery deteriorates.

Thus, the present invention is achieved in view of the circumstances and an object of the present invention is to provide an alternator controlling apparatus capable of at least surely suppressing the variation in the vehicle behavior attributed to the fluctuation of the alternator load torque as the alternator controlling apparatus according to the present invention.

Means for Solving Problem

In order to solve the above mentioned problem and achieve the object, an alternator controlling apparatus according to the present invention that sets a control amount based on a reference physical amount as a control reference of an alternator mounted on a vehicle and controls the alternator based on the set control amount, the alternator controlling apparatus includes a filter processing means that performs a filter processing of a filter target amount that is any one of the reference physical amount, the control amount and a conversion physical amount used until the control amount is set from the reference physical amount, wherein the filter processing means performs a filter processing that attenuates or removes a frequency component of at least any one of a pitch resonance frequency, a yaw resonance frequency and a roll resonance frequency of the vehicle among waveforms of the filter target amount.

In the alternator controlling apparatus, it is preferred that the filter processing means sets a gain of the frequency based on at least any one of a vehicle speed of the vehicle, a frictional situation of a road surface on which the vehicle travels and a steering angle speed of the vehicle.

In the alternator controlling apparatus, it is preferred that a battery charged by power generation of the alternator is mounted on the vehicle, and the filter processing means prohibits or limits the filter processing based on a status of the battery.

In the alternator controlling apparatus, it is preferred that the alternator controlling apparatus includes a battery voltage detecting estimating means that detects a battery voltage of the battery, wherein the filter processing means prohibits or limits the filter processing when the detected battery voltage is lower than a lower limit voltage value or higher than an upper limit voltage value.

In the alternator controlling apparatus, it is preferred that a driving system device mounted on the vehicle is controlled based on a plurality of control modes, and at least either one of the upper limit voltage value and the lower limit voltage value is changed based on the control mode.

In the alternator controlling apparatus, it is preferred that the control mode has at least a sports mode that requires to improve an output to be transmitted to the vehicle and an eco mode that requires to improve fuel consumption, and the lower limit voltage value is set to be higher when the control mode is the eco mode than when the control mode is the sports mode.

In the alternator controlling apparatus, it is preferred that the filter processing means sets the gain of the frequency to be low in accordance with decrease in the vehicle speed.

In the alternator controlling apparatus, it is preferred that the filter processing means prohibits or limits the filter processing when the vehicle speed is not higher than the lower limit vehicle speed.

In the alternator controlling apparatus, it is preferred that the lower limit vehicle speed is a vehicle speed when the vehicle is in a substantially stopped state.

Effect of the Invention

The alternator controlling apparatus according to the present invention can suppress the load fluctuation of the alternator by which the vehicle behavior varies by suppressing the variation in the filter target amount corresponding to the frequency component by performing the filter processing to attenuate or remove the frequency component. Therefore, it is possible to suppress generation of vertical load variation of a tire by the fluctuation of the engine torque attributed to the fluctuation of the alternator load torque, thereby surely suppressing the variation in the vehicle behavior. According to this, an effect to improve steering stability of the vehicle can be obtained.

BRIEF DESCRIPTION OF DRAWINGS

FIG. 3 is a view illustrating a target voltage setting map.

FIG. 4 is a view illustrating a lower limit voltage value setting map.

Figure 1:
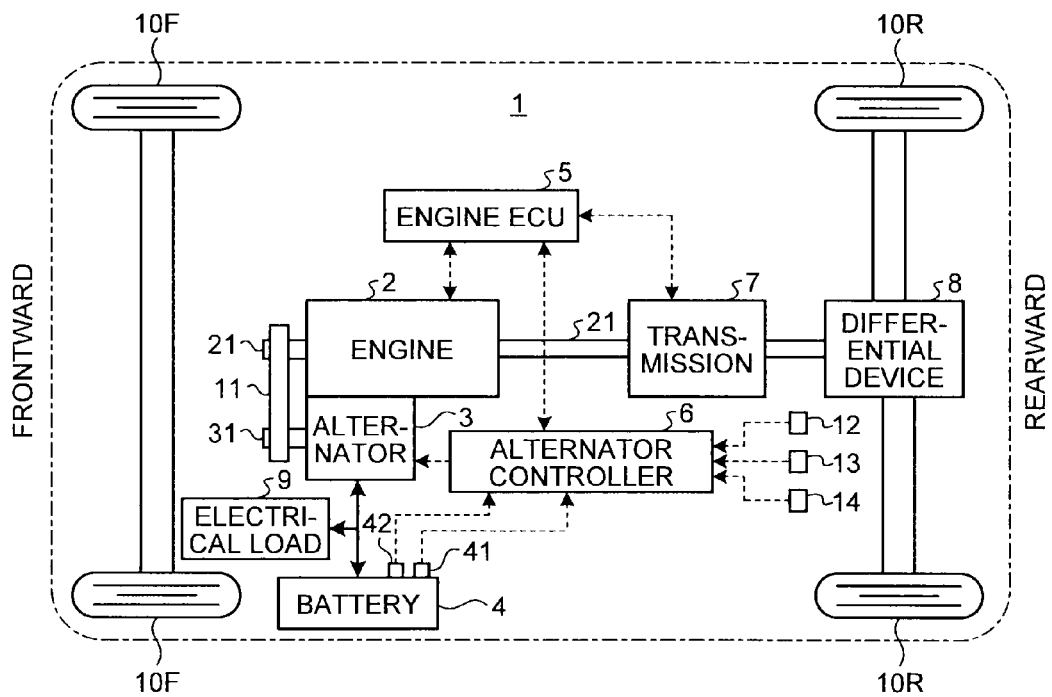
FIG. 1 is a view illustrating a schematic configuration example of a vehicle provided with an alternator controlling apparatus according to an embodiment.

EXPLANATIONS OF LETTERS OR NUMERALS 1 vehicle
2 engine
3 alternator
4 battery
5 engine ECM
6 alternator controller (alternator controlling apparatus)
61 target voltage setting unit
62 target power generation torque setting unit
63 filter processing unit (filter processing means)
63a filter process prohibition judging unit
63b filter setting unit
64 target current value setting unit
65 alternator controlling unit
66 storage unit
7 transmission
8 differential device
9 electrical load
10f front wheel
10r rear wheel
11 transmitting member
12 vehicle speed sensor
13 road surface friction estimating device
14 steering angle sensor

BEST MODE(S) FOR CARRYING OUT THE INVENTION

Hereinafter, the present invention is explained in detail with reference to the drawings. Meanwhile, the present invention is not limited by a following embodiment. Also, a component in the following embodiment includes one easily supposed by one skilled in the art or a substantially identical one.

Figure 2:
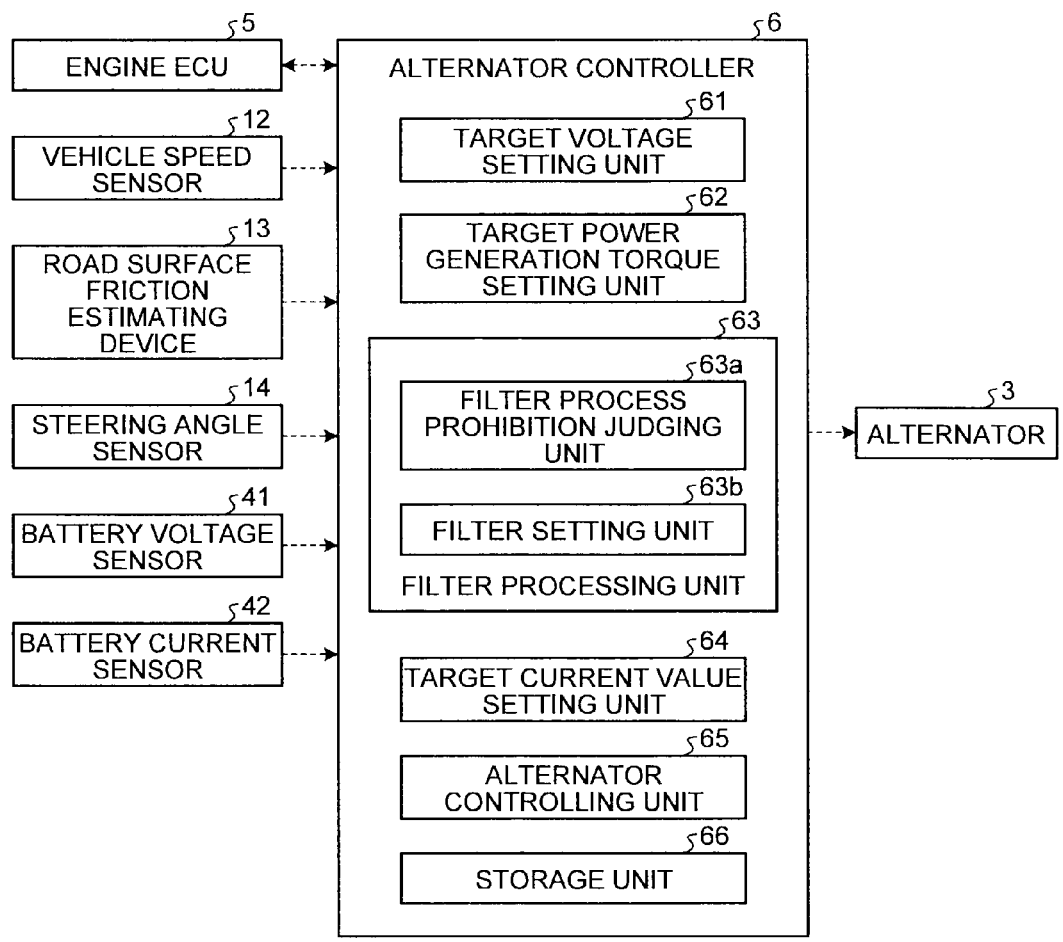
FIG. 2 is a view illustrating a configuration example of the alternator controlling apparatus.
Figures 5, 6:
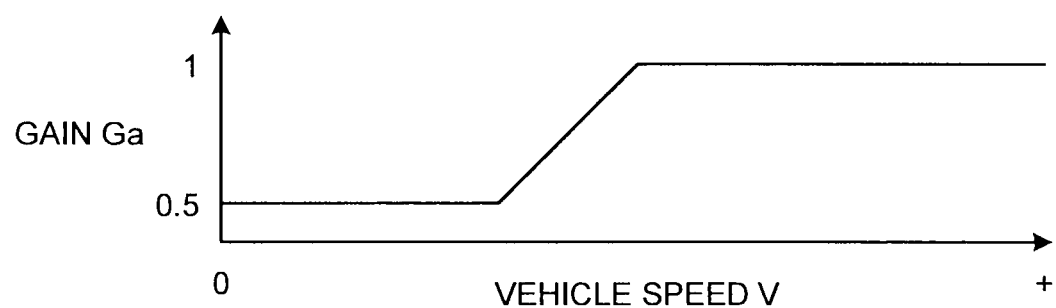
FIG. 5 is a view illustrating an upper limit voltage value setting map.
FIG. 6 is a view illustrating a gain Ga setting map.
Figure 7:
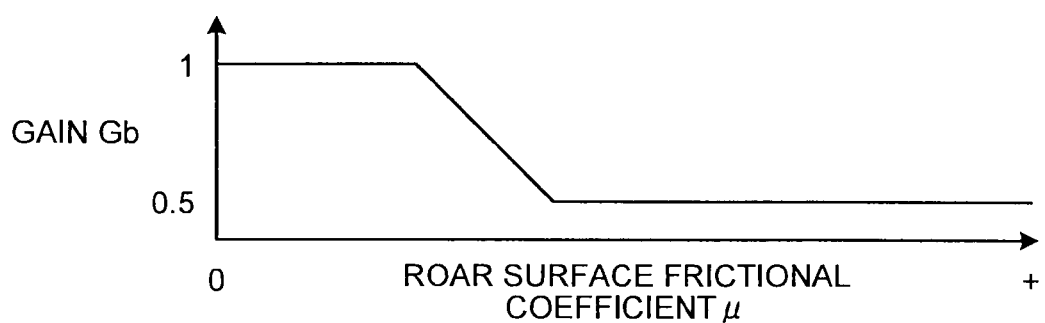
FIG. 7 is a view illustrating a gain Gb setting map.
Figure 8:
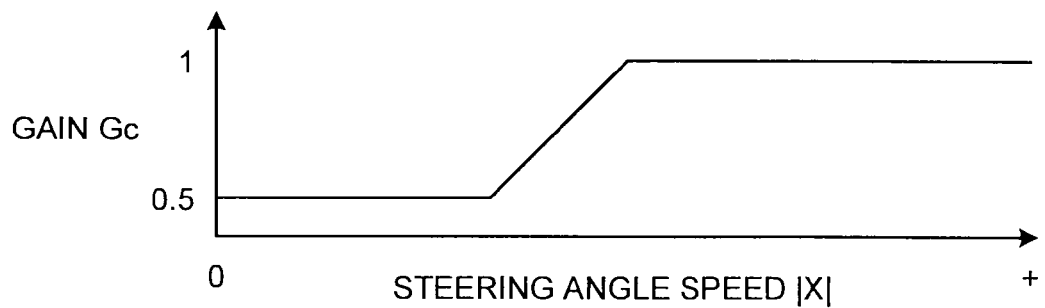
FIG. 8 is a view illustrating a gain Gc setting map.

FIG. 1 is a view illustrating a schematic configuration example of a vehicle provided with an alternator controlling apparatus according to the embodiment. FIG. 2 is a view illustrating a configuration example of the alternator controlling apparatus. FIG. 3 is a view illustrating a target voltage setting map. FIG. 4 is a view illustrating a lower limit voltage value setting map. FIG. 5 is a view illustrating an upper limit voltage value setting map. FIG. 6 is a view illustrating a gain Ga setting map. FIG. 7 is a view illustrating a gain Gb setting map. FIG. 8 is a view illustrating a gain Gc setting map. As illustrated in FIG. 1, an engine 2, an alternator 3, a battery 4, an engine ECM 5 and an alternator controller 6, which is the alternator controlling apparatus, are mounted on a vehicle 1. Meanwhile, a reference numeral 7 represents a transmission for converting braking/driving force generated by the engine 2 based on a transmission gear ratio. A reference numeral 8 represents a differential device for transmitting the braking/driving force generated by the engine 2 converted by the transmission 7 to a wheel 10R. A reference numeral 9 represents a device as an electrical load such as a wiper, a headlight, an electric power steering (EPS) and a variable gear ratio steering (VGRS) not illustrated mounted on the vehicle 1, which is activated by electric power charged in the battery 4 or electric power supplied by power generation of the alternator 3. Reference numerals 10F and 10R are wheels for transmitting the braking/driving force acting on the vehicle 1 to a road surface, in which 10F represents a front wheel and 10R represents a rear wheel. In the embodiment, the braking/driving force acting on the vehicle 1 is transmitted to the road surface through the rear wheel 10R. A reference numeral 11 represents a transmitting member for coupling the engine 2 to the alternator 3 to transmit the braking/driving force generated by the engine 2 and alternator braking/driving force generated by the alternator 3 to each other, such as a belt and a chain. Herein, a drive system device mounted on the vehicle 1 is composed of at least the engine 2, the transmission 7 and the differential device 8. Meanwhile, a reference numeral 12 represents a wheel speed sensor for detecting a wheel speed of each of the wheels 10F and 10R of the vehicle 1, and is vehicle speed detecting means for detecting a vehicle speed V of the vehicle 1 by the detected wheel speed of each of the wheels 10F and 10R. A reference numeral 13 represents a road surface friction estimating device for estimating a road surface frictional coefficient μ of the road surface on which the vehicle 1 travels, which estimates the road surface frictional coefficient μ indicating a frictional situation of the road surface on which the vehicle 1 travels. A reference numeral 14 represents a steering angle sensor for detecting a steering angle of a steering wheel not illustrated operated by a driver to turn the vehicle 1, and is steering angle speed detecting means for detecting a steering angle speed X by the detected steering angle. Herein, since means for calculating to detect the vehicle speed V of the vehicle 1 based on the detected wheel speed, means for estimating the road surface frictional coefficient μ by the road surface friction estimating device 13 (for example, estimating the road surface frictional coefficient μ based on a slip ratio of an optional wheel) and means for calculating to detect the steering angle speed X based on the detected steering angle are already known techniques, they are not herein described. Meanwhile, the steering angle speed X is positive when the steering wheel is steered in a right direction and the vehicle 1 turns to the right and is negative when the steering wheel is steered in a left direction and the vehicle 1 turns to the left.

The engine 2 is mounted on the vehicle 1 to generate an engine torque Te and operation thereof is controlled by the engine ECM 5. The engine 2 is coupled to the transmission 7 through a crankshaft 21, and the generated engine torque Te is transmitted to the transmission 7. Herein, the transmission 7 is coupled to the differential device 8 and the transmitted engine torque Te generated by the engine 2 is converted based on the transmission gear ratio to be transmitted to the differential device 8. The differential device 8 is coupled to the wheel 10R and the transmitted engine torque Te generated by the engine 2 (engine torque Te converted by the transmission 7 based on the transmission gear ratio) is transmitted to the wheel 10R. The engine 2 is capable of generating a torque larger than a power generation torque generated by the alternator 3, that is to say, an alternator load torque T1.

The alternator 3 is mounted on the vehicle 1 for generating power by the engine torque Te of the engine 2. The alternator 3 is also for allowing the alternator load torque T1 to act on the engine 2. The alternator 3 is, for example, a three-phase alternating-current generator in which a rectifier not illustrated is provided for converting the electric power generated as alternating current to direct current to output. The alternator 3 is configured to generate the electric power having an optimal voltage for supplying the electric power to the electrical load 9 and the battery 4 with a frequent engine speed of the engine 2. The alternator 3 is composed of a rotator 31 and a stator not illustrated, and the rotator 31 is coupled to the crankshaft 21 of the engine 2 through the transmitting member 11. Therefore, the braking/driving force of the engine 2 is transmitted to the rotator 31 through the transmitting member 11 and the rotator 31 rotates relative to the stator, and thereby the alternator 3 generates power. The alternator 3 is also for increasing and decreasing the load generated by the power generation to generate the alternator braking/driving force. For example, when a current load of the alternator 3 is decreased in a state in which the engine torque Te of the engine 2 is constant, the alternator load torque T1 decreases and a drive torque Td acting on the wheel 10R through the transmission 7 and the differential device 8 increases. On the other hand, for example, when the current load of the alternator 3 is increased while the engine torque Te of the engine 2 is constant, the alternator load torque T1 increases and the drive torque Td decreases. Meanwhile, the alternator 3 is connected to the alternator controller 6. Charge control of the battery 4 is performed by control of the power generation of the alternator 3 by the alternator controller 6.

The battery 4 is an electric storage device and is connected to the alternator 3 and the electrical load 9. The battery 4 is composed of a secondary battery of a rated voltage for storing the electric power generated by the alternator 3. Meanwhile, a battery voltage sensor 41 is provided in the battery 4. The battery voltage sensor 41 is battery voltage detecting means for detecting a current battery voltage Vr (V) of the battery 4. The battery voltage sensor 41 is connected to the alternator controller 6 and the detected battery voltage Vr is output to the alternator controller 6. A battery current sensor 42 is provided in the battery 4. The battery current sensor 42 is charge/discharge current detecting means for detecting a charge/discharge current value Ix (A), which is a current value when the battery 4 is charged and a current value when the battery 4 is discharged. The battery current sensor 42 is connected to the alternator controller 6 and the detected charge/discharge current value Ix is output to the alternator controller 6.

The engine ECM 5 is for performing operation control of the engine 2 and speed change control of the transmission 7. The engine ECM 5 outputs an injection signal, an ignition signal, a valve opening signal and the like to the engine 2 based on required braking/driving force required for the vehicle 1 set based on intention of the driver or calculated in automatic travel control of the vehicle 1 and outputs a speed change signal and the like to the transmission 7, and by the output signals, fuel injection control of a fuel supply amount and injection timing of fuel supplied to the engine 2 by a fuel injection valve not illustrated, ignition control of an ignition plug not illustrated, valve opening control of a throttle valve not illustrated provided in an intake air pathway not illustrated of the engine 2 and the speed change control of the transmission 7 are performed. Herein, the engine ECM 5 has a plurality of control modes and performs the operation control of the engine 2 and the speed change control of the transmission 7 according to each control mode. The control mode is selected manually by the driver or according to a driving situation of the vehicle 1. The control mode includes a sports mode requiring improvement in output transmitted to the vehicle 1, that is to say, to give priority on increase in drive torque Td over fuel consumption, an eco mode requiring improvement in the fuel consumption, that is to say, to give priority on improvement in the fuel consumption over the drive torque Td, and a normal mode between the sports mode and the eco mode, that is to say, which tries to realize compatibility between the increase in the drive torque Td and the improvement in the fuel consumption. Meanwhile, the engine ECM 5 is connected to the alternator controller 6 and information based on an operating state of the engine 2 input to the engine ECM 5, such as the control mode is appropriately output to the alternator controller 6. Herein, a hardware configuration of the engine ECM 5 is composed of a Central Processing Mnit (CPM) for principally performing calculation process, a memory for storing a program and information (RAM such as SRAM and read only memory (ROM) such as EEPROM), an input/output interface and the like, and is similar to the already known engine ECM, so that the detailed description thereof is omitted.

The alternator controller 6 constitutes the alternator controlling apparatus and controls the alternator 3. Also, the alternator controller 6 is for monitoring a state of charge of the battery 4. The alternator controller 6 has a target voltage setting unit 61, a target power generation torque setting unit 62, a filter processing unit 63, a target current value setting unit 64 and an alternator controlling unit 65 as illustrated in FIG. 2. Herein, a hardware configuration of the alternator controller 6 is substantially similar to that of the engine ECM 5, so that the detailed description thereof is omitted. Meanwhile, a reference numeral 66 represents a storage unit for storing the target voltage setting map, the upper limit voltage value setting map, the lower limit voltage value setting map, the Ga setting map, the Gb setting map, the Gc setting map and the like to be described later. Although the alternator controller 6 is composed separately from an engine ECM 170 in the embodiment, the present invention is not limited to this, and this may be one of functions of the engine ECM 170.

The target voltage setting unit 61 is for setting a target voltage V* (V). In the embodiment, the target voltage V* (V) is a reference physical amount as a control reference of the alternator 3 mounted on the vehicle 1. The target voltage setting unit 61 is for setting the target voltage V* based on an acceleration/deceleration state of the vehicle 1 and a SOC value A (%), which is the state of charge of the battery, for example. Specifically, the target voltage setting unit 61 sets the target voltage V* based on the acceleration/deceleration state of the vehicle 1, the SOC value A and the target voltage setting map stored in the storage unit 66. Meanwhile, the target voltage V* set by the target voltage setting unit 61 is output to the target power generation torque setting unit 62. Meanwhile, the SOC value A is calculated based on the charge/discharge current value Ix detected by the battery current sensor 42 and output to the alternator controller 6. The alternator controller 6 calculates a value obtained by dividing a time integration value of the detected charge/discharge current value Ix by a battery capacity K of the battery 4 as the SOC value A, for example.

Herein, the target voltage setting map is a setting map based on relationship among the acceleration/deceleration state, the SOC value A and the target voltage V* as illustrated in FIG. 3, and is capable of setting the target voltage V* from the acceleration/deceleration state of the vehicle 1 and the SOC value A. In the embodiment, in the target voltage setting map, the target voltage V* is set in advance to three voltages, which are LOW, MID and HIGH and volumes as the voltage are in relationship of LOW<MID<HIGH. Also, in the target voltage setting map, the acceleration/deceleration state is set in advance to three states, which are under deceleration, under constant travel and under acceleration. Also, in the target voltage setting map, the state of charge of the battery 4 is set to three states, which are a high state of charge, a middle state of charge and a low state of charge by the relationship among the SOC value A and threshold values B and C in advance. Herein, the threshold value B is a value with which the SOC value A of the battery 4 is judged to be sufficiently large and the threshold value C is a value with which the SOC value A of the battery 4 is judged to be sufficiently small, and they are in relationship of threshold value B>threshold value C. The high state of charge is a state in which the SOC value A is not smaller than the threshold value B, the middle state of charge is a state in which the SOC value A is smaller than the threshold value B and larger than the threshold value C, and the low state of charge is a state in which the SOC value A is not larger than the threshold value C. In the target voltage setting map, when the vehicle 1 is under deceleration, the target voltage V* is set to be higher than that when the vehicle 1 is under constant travel or under acceleration, and when the vehicle 1 is under acceleration, the target voltage V* is set to be lower than that when the vehicle 1 is under deceleration or under constant travel. Also, in the target voltage setting map, it is not required to positively charge the battery 4 at the time of the high state of charge and when the SOC value A of the battery 4 is sufficiently large, so that the target voltage V* is set to be lower than that at the time of the middle state of charge or the low state of charge. On the other hand, in the target voltage setting map, at the time of the low state of charge and when the SOC value A of the battery 4 is sufficiently small, it is required to positively charge the battery 4, so that the target voltage V* is set to be higher than that at the time of the high state of charge or the middle state of charge. Meanwhile, the high state of charge may be a state in which the SOC value A is larger than the threshold value B, the middle state of charge may be a state in which the SOC value A is not larger than the threshold value B and not smaller than the threshold value C, and the low state of charge may be a state in which the SOC value A is smaller than the threshold value C.

The target power generation torque setting unit 62 is for setting the target power generation torque To. In the embodiment, the target power generation torque To is a conversion physical amount used until a target current value Io as a control amount set by the target current value setting unit 64, is set from the target voltage V* as a reference physical amount set by the target voltage setting unit 61, and is a filter target amount. In the embodiment, the target power generation torque setting unit 62 calculates deviation Vd between the target voltage V* set by the target voltage setting unit 61 and the battery voltage Vr detected by the battery voltage sensor 41 and is output to the alternator controller 6, and calculates a value obtained by multiplying a gain g1 for converting the voltage value to the power generation torque by the calculated deviation Vd as the target power generation torque To. Meanwhile, the target power generation torque To set by the target power generation torque setting unit 62 is output to the filter processing unit 63 as the filter target amount.

The filter processing unit 63 is filter processing means for filtering the target power generation torque To as the filter target amount. Herein, among vehicle behavior, generation of variation in vertical load of a tire not illustrated by pitching of the vehicle 1 most affects vehicle motion and affects steering stability. In the embodiment, the filter processing unit 63 is for performing a filter processing for attenuating or removing a component of a pitch resonance frequency of the vehicle 1, which affects the pitching of the vehicle 1, among waveforms of the target power generation torque To. The filter processing unit 63 has at least a filter process prohibition judging unit 63a and a filter setting unit 63b. The filter process prohibition judging unit 63a is for judging whether to prohibit the filter processing of the target power generation torque To by the filter processing unit 63. The filter process prohibition judging unit 63a turns on a filter process prohibition flag (F=1) when the filter processing of the target power generation torque To is prohibited and turns off the filter process prohibition flag (F=0) when this is not prohibited. The filter process prohibition judging unit 63a judges whether to prohibit the filter processing based on the vehicle speed V of the vehicle 1 and battery status. When it is judged that the filter processing of the target power generation torque To is prohibited by the filter process prohibition judging unit 63a, the filter processing unit 63 does not perform the filter processing of the target power generation torque To and directly outputs the target power generation torque To to the target current value setting unit 64.

When the vehicle speed V detected by the vehicle speed sensor 12 is not higher than a lower limit vehicle speed Vo, the filter process prohibition judging unit 63a judges to prohibit the filter processing of the target power generation torque To by the filter processing unit 63. Herein, the lower limit vehicle speed Vo is a vehicle speed when the vehicle 1 is in a substantially stopped state, for example, the vehicle speed, which can not be actually detected by the vehicle speed sensor 12 (for example, approximately a few km/h). When the vehicle 1 is in the substantially stopped state, variation in the vehicle behavior can be allowed, so that the charge control of the battery 4 has priority and the battery 4 can be efficiently charged.

When the battery voltage Vr detected by the battery voltage sensor 41 as the battery status is lower than a lower limit voltage value VA, since discharge capacity of the battery 4 is limited, the filter process prohibition judging unit 63*a* judges to prohibit the filter processing of the target power generation torque To by the filter processing unit 63. Also, when the detected battery voltage Vr is higher than an upper limit voltage value VB, since charge capacity of the battery 4 is limited, the filter process prohibition judging unit 63*a* judges to prohibit the filter processing of the target power generation torque To by the filter processing unit 63. Meanwhile, the filter process prohibition judging unit 63*a* may judge to prohibit the filter processing of the target power generation torque To by the filter processing unit 63 when the detected battery voltage Vr is not higher than the lower limit voltage value VA or not lower than the upper limit voltage value VB.

Herein, the lower limit voltage value VA is set based on the control mode output from the engine ECM 5 to the alternator controller 6 to be obtained and an operating state of the device, which is the electrical load 9. Specifically, the filter process prohibition judging unit 63*a* sets the lower limit voltage value VA based on the obtained control mode, the operating state of the headlight and the wiper not illustrated, which is the electrical load 9, of which variation in operation is easily recognized by the driver, and the lower limit voltage value setting map stored in the storage unit 66. The lower limit voltage value setting map is a setting map based on relationship between the control mode and an on/off state of the headlight and the wiper as illustrated in FIG. 4, and is capable of setting the lower limit voltage value VA from the control mode and the on/off state of the headlight and the wiper. In the lower limit voltage value setting map, in the embodiment, the control mode is set to three modes, which are the sports mode, the normal mode and the eco mode, and relationship of a level of importance of suppression of the variation in the vehicle behavior by the filter processing of the target power generation torque To is such that sports mode>normal mode>eco mode. The lower limit voltage value setting map is set to two states, which are an off state in which both of the headlight and the wiper are turned off and an on state in which at least either of the headlight and the wiper is turned on, and relationship of a level of importance of suppression of variation in the operating state by the filter processing of the target power generation torque To is such that off state<on state. In the lower limit voltage value setting map, when the control mode is the sports mode and the suppression of the variation in the vehicle behavior by the filter processing of the target power generation torque To has priority, it is wanted that the filter processing of the target power generation torque To is positively performed, so that the lower limit voltage value VA is set to be lower than that in the normal mode or the eco mode. On the other hand, when the control mode is the eco mode and the fuel consumption has priority over the variation in the vehicle behavior by the filter processing of the target power generation torque To, it is wanted that the power is efficiently generated by the alternator 3, so that the lower limit voltage value VA is set to be higher than that in the normal mode or the eco mode. In the lower limit voltage value setting map, at the time of the on state, the lower limit voltage value VA corresponding to each control mode is set to be higher than that in the case of the off state. This is for suppressing sense of discomfort felt by the driver due to large variation in the operating state when at least either of the headlight and the wiper is turned on, because in the on state, the power generation amount of the alternator 3 decreases and voltage fluctuation becomes large by the filter processing of the target power generation torque To (the voltage in the electric system of the vehicle 1 including the battery 4 and the electrical load 9 decreases).

The upper limit voltage value VB is set based on the control mode output from the engine ECM 5 to the alternator controller 6 to be obtained. Specifically, the filter process prohibition judging unit 63*a* sets the upper limit voltage value VB based on the obtained control mode and the upper limit voltage value setting map stored in the storage unit 66. The upper limit voltage value setting map is a setting map based on the control mode as illustrated in FIG. 5, and is capable of setting the upper limit voltage value VB from the control mode. In the upper limit voltage value setting map, although the control mode is set to the three modes, which are the sports mode, the normal mode and the eco mode in the embodiment, a constant value is set as the upper limit voltage value VB regardless of the control mode for preventing trouble by voltage increase in the electric system of the vehicle 1.

The filter process prohibition judging unit 63*a* judges to prohibit the filter processing of the target power generation torque To by the filter processing unit 63 when the battery status other than the battery voltage Vr is not excellent as the battery status as illustrated in FIG. 2. The filter process prohibition judging unit 63*a* judges whether the battery 4 is excellent by a deterioration state, a failure state and a control state of the battery 4 in the embodiment. The filter process prohibition judging unit 63*a* judges that the battery 4 is not excellent when the battery 4 is in at least any one of a deteriorated state, a failed state and a refresh control state.

The filter setting unit 63*b* is for setting a filter S. The filter setting unit 63*b* is for setting the filter S based on a frequency f and a gain G. The filter setting unit 63*b* sets the filter S by setting an attenuation amount of a component of the frequency f among the waveforms of the target power generation torque To to the gain G in the embodiment. The filter S to attenuate more of the component of the frequency f among the waveforms of the target power generation torque To in accordance with increase in the gain G is set, and the filter S to remove the component of the frequency f among the waveforms of the target power generation torque To when the gain G is 1 is set.

The filter setting unit 63*b* calculates the frequency f based on a vehicle model of the vehicle 1. The filter setting unit 63*b* calculates a pitch resonance frequency (for example, 1.5 to 2 Hz) calculated based on the vehicle model of the vehicle 1 stored in the storage unit 66 in advance as the frequency f in the embodiment. Herein, in the embodiment, spring properties of a suspension not illustrated are changed based on the control modes by a suspension ECU not illustrated, so that the filter setting unit 63*b* calculates the frequency f based on the vehicle model and the control mode. This is because the pitch resonance frequency varies even in the same vehicle 1 based on spring properties of the suspension. Meanwhile, regardless of the control modes, when the spring properties of the suspension can be changed manually or automatically, the filter setting unit 63*b* calculates the frequency f based on the vehicle model and the spring properties of the suspension. Meanwhile, the vehicle model includes pitch inertia moment I, a pitch rotation spring constant K, a pitch rotation attenuation coefficient C, disturbance M (calculated based on the pitch inertia moment I, the pitch rotation spring constant K, the pitch rotation attenuation coefficient C and a pitch angle θ). The pitch resonance frequency is also based on the pitch rotation spring constant K and the pitch rotation moment, so that this varies when the spring properties of the suspension are changed.

Also, the filter setting unit 63b sets the gain G of the calculated frequency f. In the embodiment, the filter setting unit 63b sets the gain G based on the vehicle speed V of the vehicle 1, the frictional situation of the road surface on which the vehicle 1 travels and the steering angle speed X of the vehicle 1. Specifically, the filter setting unit 63b calculates the gain Ga based on the vehicle speed V of the vehicle 1 detected by the vehicle speed sensor 12 and is output to the alternator controller 6 and the gain Ga setting map stored in the storage unit 66 in advance, calculates the gain Gb based on the road surface frictional coefficient μ estimated by the road surface friction estimating device 13 and is output to the alternator controller 6 and the gain Gb setting map, calculates the gain Gc based on an absolute value |X| of the steering angle speed X of the steering wheel not illustrated detected by the steering angle sensor 14 and is output to the alternator controller 6 and the gain Gc setting map stored in the storing unit 66 in advance, and sets a value obtained by multiplying the gain Ga, Gb and Gc as the gain G.

Herein, the gain Ga setting map is a setting map based on relationship between the vehicle speed V of the vehicle 1 and the gain Ga as illustrated in FIG. 6, and is capable of calculating the gain Ga from the vehicle speed V of the vehicle 1. The gain Ga setting map is set such that the gain Ga is lower when the vehicle speed V of the vehicle 1 is low as compared to a case in which this is high. That is to say, the filter setting unit 63b of the filter processing unit 63 sets the gain G of the frequency f to be low in accordance with decrease in the vehicle speed V of the vehicle 1. The gain Ga setting map is set such that the gain Ga is calculated between 0.5 to 1 based on the vehicle speed V of the vehicle 1 in the embodiment, and this is set such that the gain Ga is 0.5 with the vehicle speed V of the vehicle 1 from 0 km/h to a first predetermined vehicle speed, the gain Ga increases from 0.5 to 1 with the vehicle speed V from the first predetermined vehicle speed to a second predetermined vehicle speed and the gain Ga is 1.0 with the vehicle speed V not lower than the second predetermined vehicle speed. The vehicle 1 becomes sensitive to fluctuation of the engine torque Te based on fluctuation of the alternator load torque T1 in accordance with the increase in the vehicle speed V. In the gain Ga setting map, the gain Ga is calculated to be large so as to be able to attenuate more of the component of the frequency f among the waveforms of the target power generation torque To when the vehicle speed V is high as compared to a case in which this is low. Therefore, by filtering the target power generation torque To by the filter processing unit 63, vibration in a pitch direction of the vehicle 1 can be suppressed when the vehicle speed V is high as compared to a case in which this is low, thereby suppressing the variation in the vehicle behavior. Since the vehicle 1 becomes insensitive to the fluctuation of the engine torque Te based on the fluctuation of the alternator load torque T1 in accordance with decrease in the vehicle speed V, the variation in vehicle behavior can be allowed when the vehicle speed V is low as compared to the case in which this is high, so that the charge control of the battery 4 has priority and the battery 4 can be efficiently charged.

Herein, the gain Gb setting map is a setting map based on relationship between the road surface frictional coefficient μ and the gain Gb as illustrated in FIG. 7, and is capable of calculating the gain Gb from the road surface frictional coefficient μ. The gain Gb setting map is set such that the gain Ga is higher when the road surface frictional coefficient μ is low as compared to a case in which this is high. That is to say, the filter setting unit 63b of the filter processing unit 63 sets the gain G of the frequency f to be high in accordance with decrease in the road surface frictional coefficient μ. In the embodiment, the gain Gb setting map is set such that the gain Gb is calculated between 0.5 to 1 based on the road surface frictional coefficient μ, and is set such that the gain Ga is 1 with the road surface frictional coefficient μ from 0 to a first predetermined value, the gain Gb decreases from 1 to 0.5 with the road surface frictional coefficient μ from the first predetermined value to a second predetermined value, and the gain Ga is 0.5 with the road surface frictional coefficient μ not smaller than the second predetermined value. The vehicle 1 easily slips when the road surface frictional coefficient μ is low, so that this becomes sensitive to the fluctuation of the engine torque Te based on the fluctuation of the alternator load torque T1 in accordance with the decrease in the road surface frictional coefficient μ. In the gain Gb setting map, the gain Gb is calculated to be large such that more of the component of the frequency f among the waveforms of the target power generation torque To can be attenuated when the road surface frictional coefficient μ is low as compared to the case in which this is high. Therefore, by filtering the target power generation torque To by the filter processing unit 63, when the road surface frictional coefficient μ is low, the vibration in the pitch direction of the vehicle 1 can be suppressed as compared to a case in which this is high, thereby suppressing the variation in the vehicle behavior. Also, since the vehicle 1 becomes insensitive to the fluctuation of the engine torque Te based on the fluctuation of the alternator load torque T1 in accordance with increase in the road surface frictional coefficient μ, when the road surface frictional coefficient μ is high, the variation in the vehicle behavior can be allowed as compared to a case in which this is low, so that the charge control of the battery 4 has priority and the battery 4 can be efficiently charged.

Herein, the gain Gc setting map is a setting map based on relationship between the absolute value |X| of the steering angle speed and the gain Gc as illustrated in FIG. 8, and is capable of calculating the gain Gc from the absolute value |X| of the steering angle speed. The gain Gc setting map is set such that the gain Gc is higher when the absolute value |X| of the steering angle speed is large as compared to a case in which this is small. That is to say, the filter setting unit 63b of the filter processing unit 63 sets the gain G of the frequency f to be high in accordance with increase in the absolute value |X| of the steering angle speed. The gain Gc setting map is set such that the gain Gc is calculated between 0.5 to 1 according to the absolute value |X| of the steering angle speed, and is set such that the gain Gc is 0.5 with the absolute value |X| of the steering angle speed 0 to a first predetermined absolute value, the gain Gc increases from 0.5 to 1 with the absolute value |X| from the first predetermined absolute value to a second predetermined absolute value, and the gain Gc is 1.0 with the absolute value |X| not smaller than the second predetermined absolute value. The vehicle 1 becomes sensitive to the fluctuation of the engine torque Te based on the fluctuation of the alternator load torque T1 at initial time of turn and becomes sensitive in accordance with the increase in the absolute value |X| of the steering angle speed. In the gain Gc setting map, the gain Gc is calculated to be large when the absolute value |X| of the steering angle speed is high, such that more of the component of the frequency f among the waveforms of the target power generation torque To can be attenuated as compared to a case in which this is low. Therefore, by filtering the target power generation torque To by the filter processing unit 63, when the absolute value |X| of the steering angle speed is large the vibration in the pitch direction of the vehicle 1 can be suppressed as compared to a case in which this is small, thereby suppressing the variation in the vehicle behavior. Also, since the vehicle 1 becomes insensitive to the fluctuation of the engine torque Te based on the fluctuation of the alternator load torque Ti in accordance with decrease in the absolute value |X| of the steering angle speed, when the absolute value |X| of the steering angle speed is small, the variation in the vehicle behavior can be allowed as compared to a case in which this is large, so that the charge control of the battery 4 has priority and the battery 4 can be efficiently charged.

The target current value setting unit 64 is for setting the target current value Io (A). In the embodiment, the target current value Io (A) is the control amount for controlling the alternator 3. The target current value setting unit 64 sets as the target current value Io, a value obtained by multiplying a gain g2 to convert the torque to the current value by the target power generation torque To set by the target power generation torque setting unit 62 and the filter processing of which is performed by the filter processing unit 63, or the target power generation torque To set by the target power generation torque setting unit 62 and the filter processing of which is not performed by the filter processing unit 63. Meanwhile, the target current value Io set by the target current value setting unit 64 is output to the alternator controlling unit 65.

The alternator controlling unit 65 is for controlling the alternator 3. The alternator controlling unit 65 controls the alternator 3 by increasing and decreasing a field current of the alternator 3. The alternator controlling unit 65 increases and decreases the field current of the alternator 3 based on the target current value Io set by the target current value setting unit 63. Therefore, the alternator controller 6 controls the alternator 3 based on the set target current value Io.

Figure 9:
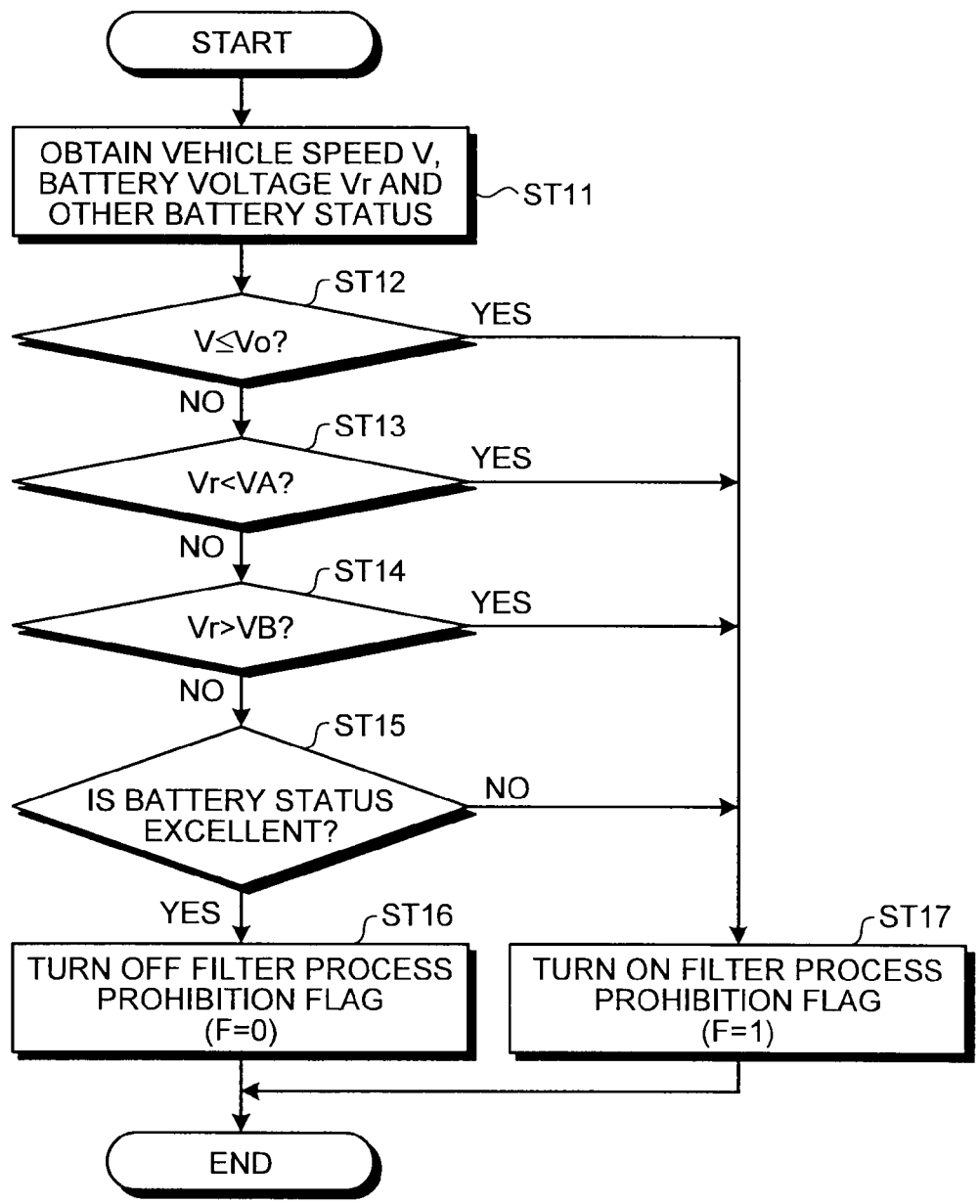
FIG. 9 is a flow diagram of a filter process prohibition judging method.
Figure 10:
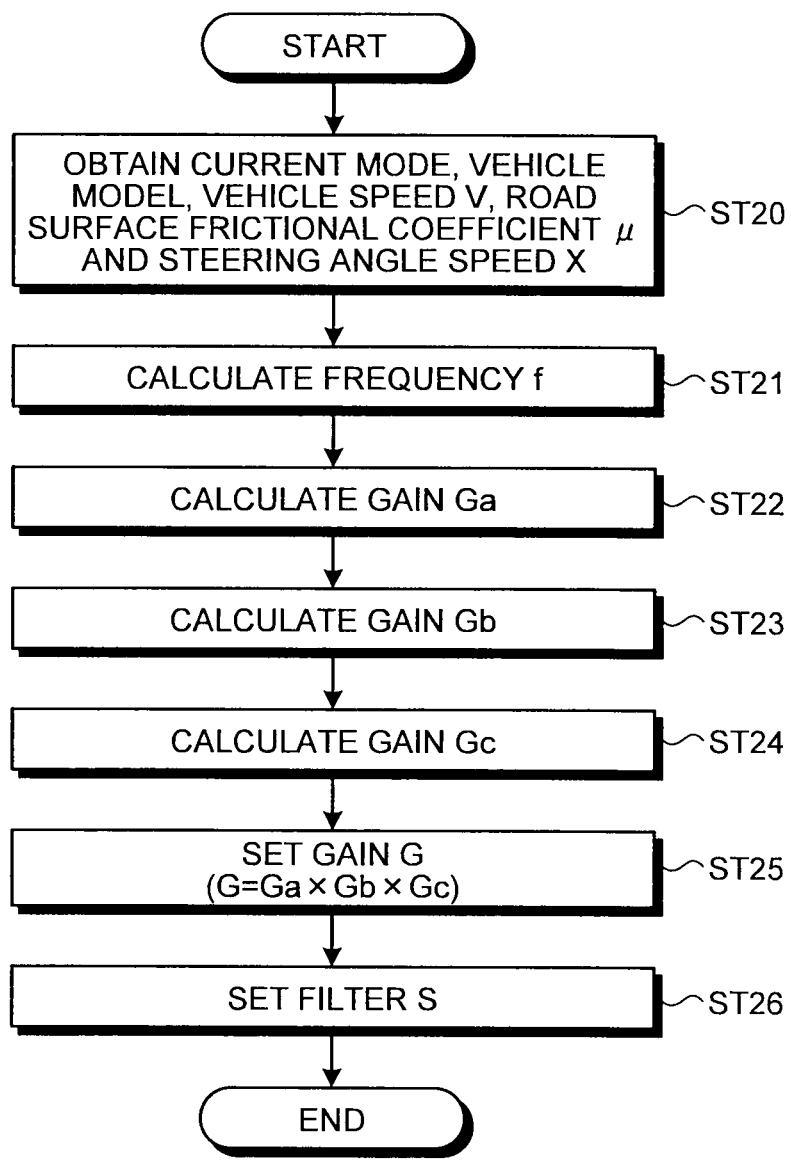
FIG. 10 is a flow diagram of a filter S setting method.
Figure 11:
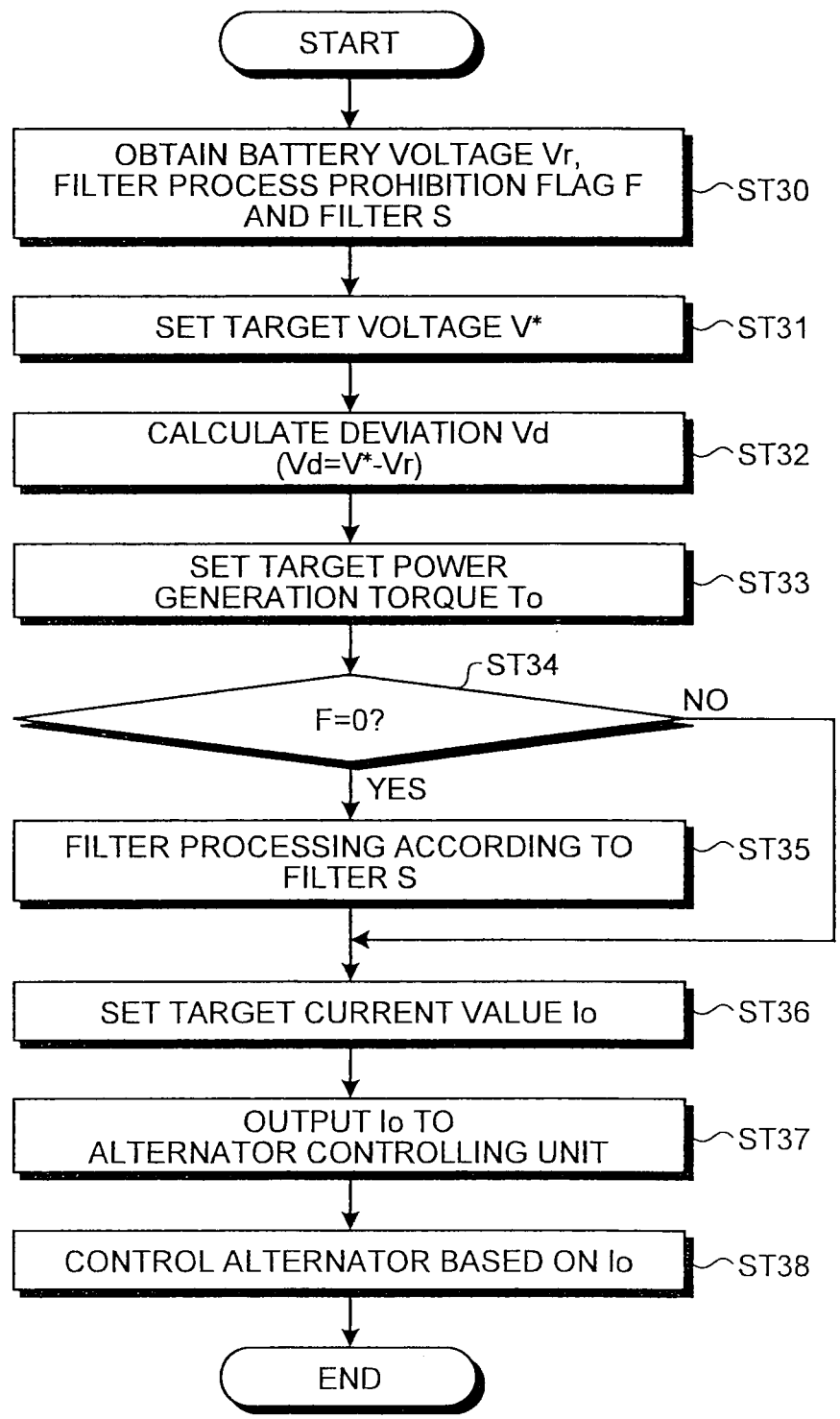
FIG. 11 is a flow diagram of an alternator controlling method.

Next, operation of the alternator controller 6 is explained. Herein, an alternator controlling method by the alternator controller 6 is explained. FIG. 9 is a flow diagram of a filter process prohibition judging method. FIG. 10 is a flow diagram of a filter S setting method. FIG. 11 is a flow diagram of an alternator controlling method. Meanwhile, the alternator controller 6 executes the alternator controlling method based on a predetermined control period.

The filter process prohibition judgment by the alternator controller 6 is first explained. The filter process prohibition judging unit 63a of the filter processing unit 63 first obtains the vehicle speed V, the battery voltage Vr and other battery status as illustrated in FIG. 9 (step ST11). Herein, the filter process prohibition judging unit 63a obtains the vehicle speed V of the vehicle 1 detected by the vehicle speed sensor 12 and is output to the alternator controller 6, obtains the battery voltage Vr detected by the battery voltage sensor 41 and is output to the alternator controller 6, and obtains the deterioration state, the failure state and the control state of the battery 4 judged based on the obtained battery voltage Vr and the charge/discharge current value Ix detected by the battery current sensor 42 and is output to the alternator controller 6.

Next, the filter process prohibition judging unit 63a judges whether the obtained vehicle speed V is not higher than the lower limit vehicle speed Vo (step ST12). Herein, the filter process prohibition judging unit 63a judges whether the obtained vehicle speed V is not higher than the lower limit vehicle speed Vo set in advance, thereby judging whether it is necessary to perform the filter processing of the target power generation torque To based on the vehicle speed V of the vehicle 1.

Next, when the filter process prohibition judging unit 63a judges that the obtained vehicle speed V is not higher than the lower limit vehicle speed Vo (step ST12: yes), this turns on the filter process prohibition flag (F=1) to terminate a current control period and shifts to a next control period (step ST17).

Also, when the filter process prohibition judging unit 63a judges that the obtained vehicle speed V is higher than the lower limit vehicle speed Vo (step ST12: no), this judges whether the obtained battery voltage Vr is lower than the lower limit voltage value VA (step ST13). Herein, the filter process prohibition judging unit 63a sets the lower limit voltage value VA in advance based on the current mode, the on/off state of the headlight and the wiper and the lower limit voltage value setting map to judge whether the obtained battery voltage Vr is lower than the set lower limit voltage value VA, thereby judging whether it is necessary to perform the filter processing of the target power generation torque To based on the battery status.

Next, when the filter process prohibition judging unit 63a judges that the obtained battery voltage Vr is lower than the lower limit voltage value VA (step ST13: yes), this turns on the filter process prohibition flag (F=1) to terminate the current control period and shifts to the next control period (step ST17).

Also, when the filter process prohibition judging unit 63a judges that the obtained battery voltage Vr is not lower than the lower limit voltage value VA (step ST13: no), this judges whether the obtained battery voltage Vr is higher than the upper limit voltage value VB (step ST14). Herein, the filter process prohibition judging unit 63a sets the upper limit voltage value VB in advance based on the upper limit voltage value setting map and judges whether the obtained battery voltage Vr is higher than the set upper limit voltage value VB, thereby judging whether it is necessary to perform the filter processing of the target power generation torque To based on the battery status.

Next, when the filter process prohibition judging unit 63a judges that the obtained battery voltage Vr is higher than the upper limit voltage value VB (step ST14: yes), this turns on the filter process prohibition flag (F=1) to terminate the current control period and shifts to the next control period (step ST17).

Also, when the filter process prohibition judging unit 63a judges that the obtained battery voltage Vr is not higher than the upper limit voltage value VB (step ST14: no), this judges whether the battery status is excellent based on the obtained other battery status (step ST15). Herein, the filter process prohibition judging unit 63a judges whether the battery 4 is at least any one of the deteriorated status, the failed state and the refresh control state based on the deterioration state, the failure state and the control state of the battery 4, which is the other battery status, thereby judging whether it is necessary to perform the filter processing of the target power generation torque To based on the battery status.

Next, when the filter process prohibition judging unit 63a judges that the battery status is not excellent based on the obtained other battery status (step ST15: no), this turns on the filter process prohibition flag (F=1) to terminate the current control period and shifts to the next control period (step ST17).

Also, when the filter process prohibition judging unit 63a judges that the battery status is excellent based on the obtained other battery status (step ST15: yes), this turns off the filter process prohibition flag (F=0) to terminate the current control period and shifts to the next control period (step ST16).

Next, setting of the filter S by the alternator controller 6 is explained. The filter setting unit 63b of the filter processing unit 63 first obtains the current mode, the vehicle model, the vehicle speed V, the road surface frictional coefficient Ix and the steering angle speed X as illustrated in FIG. 10 (step ST20). Herein, the filter setting unit 63b obtains the control mode output from the engine ECM 5 to the alternator controller 6, obtains the vehicle model of the vehicle 1 stored in the storage unit 66 in advance, obtains the vehicle speed V of the vehicle 1 detected by the vehicle speed sensor 12 and is output to the alternator controller 6, obtains the road surface frictional coefficient t estimated by the road surface friction estimating device 13 and is output to the alternator controller 6, and obtains the steering angle speed X detected by the steering angle sensor 14 and is output to the alternator controller 6.

Next, the filter setting unit 63b calculates the frequency f (step ST21). Herein, the filter setting unit 63b calculates the frequency f based on the obtained vehicle model of the vehicle 1 and the obtained control mode (current mode).

Next, the filter setting unit 63b calculates the gain Ga (step ST22). Herein, the filter setting unit 63b calculates the gain Ga based on the obtained vehicle speed V of the vehicle 1 and the gain Ga setting map.

Next, the filter setting unit 63b calculates the gain Gb (step ST23). Herein, the filter setting unit 63b calculates the gain Gb based on the obtained road surface frictional coefficient t and the gain Gb setting map.

Next, the filter setting unit 63b calculates the gain Gc (step ST24). Herein, the filter setting unit 63b calculates the gain Gc based on the obtained absolute value |X| of the steering angle speed and the gain Gc setting map.

Next, the filter setting unit 63b sets the gain G (step ST25). Herein, the filter setting unit 63b sets the value obtained by multiplying the calculated gains Ga, Gb and Gc as the gain G.

Next, the filter setting unit 63b sets the filter S (step ST26). Herein, the filter setting unit 63b sets the filter S based on the frequency f and the gain G to terminate the current control period and shifts to the next control period.

The alternator controlling method by the alternator controller 6 is explained. The alternator controller 6 obtains the battery voltage Vr, the filter process prohibition flag F and the filter S as illustrated in FIG. 11 (step ST30). Herein, the alternator controller 6 obtains the battery voltage Vr detected by the battery voltage sensor 41 and is output to the alternator controller 6, obtains the filter process prohibition flag F judged by the filter process prohibition judging unit 63a, and obtains the filter S set by the filter setting unit 63b.

Next, the target voltage setting unit 61 of the alternator controller 6 sets the target voltage V* (step ST31). Herein, the target voltage setting unit 61 sets the target voltage V* based on the acceleration/deceleration state of the vehicle 1, the SOC value A and the target voltage setting map.

Next, the target power generation torque setting unit 62 of the alternator controller 6 calculates the deviation Vd (step ST32). Herein, the target power generation torque setting unit 62 calculates the deviation Vd between the target voltage V* set by the target voltage setting unit 61 and the battery voltage Vr detected by the battery voltage sensor 41 and is output to the alternator controller 6.

Next, the target power generation torque setting unit 62 sets the target power generation torque To (step ST33). Herein, the value obtained by multiplying the gain g1 by the calculated deviation Vd is set as the target power generation torque To and the set target power generation torque To is output to the filter processing unit 63.

Next, the filter processing unit 63 judges whether the filter process prohibition flag F is 0 (step ST34). Herein, the filter processing unit 63 judges whether to prohibit the filter processing of the set target power generation torque To.

Next, when the filter processing unit 63 judges that the filter process prohibition flag F is 0 (step ST34: yes), this performs the filter processing of the target power generation torque To based on the filter S (step ST35). Herein, the filter processing unit 63 performs the filter processing of the target power generation torque To so as to attenuate or remove the component of the frequency f among the waveforms of the set target power generation torque To based on the gain G and outputs the target power generation torque To, the filter processing of which is performed to the target current value setting unit 64.

When the filter processing unit 63 judges that the filter process prohibition flag F is 1 (step ST34: no), this does not perform the filter processing of the target power generation torque To based on the filter S and outputs the target power generation torque To, the filter processing of which is not performed to the target current value setting unit 64.

Next, the target current value setting unit 64 of the alternator controller 6 sets the target current value Io (step ST36). Herein, the target current value setting unit 64 sets the value obtained by multiplying the gain g2 by either of the target power generation torque To, the filter processing of which is performed, and the target power generation torque To, the filter processing of which is not performed, as the target current value Io.

Next, the target current value setting unit 64 outputs the set target current value Io to the alternator controlling unit 65 (step ST37).

Next, the alternator controlling unit 65 controls the alternator 3 based on the set target current value Io (step ST38).

As described above, the alternator controlling apparatus according to the embodiment suppresses the variation in the target power generation torque To corresponding to the component of the frequency by performing the filter processing to attenuate or remove the component of the frequency f to the target power generation torque To. Therefore, the load fluctuation of the alternator 3 by which the vehicle behavior varies can be suppressed by suppressing the variation in the target power generation torque To. According to this, the vibration in the pitch direction of the vehicle 1 can be suppressed by the fluctuation of the engine torque attributed to the fluctuation of the alternator load torque, and the generation of the vertical load variation of the tire can be suppressed, so that the variation in the vehicle behavior can be surely suppressed. According to this, the steering stability of the vehicle can be improved. Also, in a case in which the variation in the vehicle behavior can be allowed, the filter processing is prohibited or the filter processing is performed to the target power generation torque To by making the attenuation amount of the component of the frequency f smaller, and the charge control of the battery 4 has priority and the battery 4 can be efficiently charged.

Meanwhile, although the gain G is set from the gain Ga based on the vehicle speed V, the gain Gb based on the road surface frictional coefficient μ and the gain Gc based on the steering angle speed X in the embodiment, the present invention is not limited to this and any one of the three gains Ga, Gb and Gc may be made the gain G or the gain G may be set based on any two of them.

Also, although the filter target amount is made the target power generation torque To in the embodiment, the present invention is not limited to this and the target voltage V* as the reference physical amount or the target current value Io as the control amount may be made the filter target amount. That is to say, the filter processing unit 63 may perform the filter processing of the target voltage V* and the target current value Io. Although the conversion physical amount is made the target power generation torque To, the present invention is not limited to this, and a target power generation amount Wo of the alternator 3 may be made the conversion physical amount, and in this case, the filter processing unit 63 performs the filter processing of the target power generation amount Wo.

Although the filter processing unit 63 prohibits the filter processing of the target power generation torque To based on the vehicle speed V of the vehicle 1, the battery voltage Vr and other battery status in the embodiment, the present invention is not limited to this, and the filter processing of the target power generation torque To may be limited based on the vehicle speed V of the vehicle 1, the battery voltage Vr and other battery status. For example, the gain G of the frequency f may be set to be small based on the vehicle speed V of the vehicle 1, the battery voltage Vr and other battery status.

INDUSTRIAL APPLICABILITY

As described above, the alternator controlling apparatus is applicable as the alternator controlling apparatus for setting the control amount based on the reference physical amount as the control reference of the alternator mounted on the vehicle and controlling the alternator based on the set control amount, and especially suitable for surely suppressing the variation in the vehicle behavior attributed to the fluctuation of the alternator load torque.

The invention claimed is:

1. An alternator controlling apparatus that sets a control amount based on a reference physical amount as a control reference of an alternator mounted on a vehicle and controls the alternator based on the set control amount, the alternator controlling apparatus comprising:
   a filter processing unit that performs a filter processing of a filter target amount that is any one of the reference physical amount, the control amount and a conversion physical amount used until the control amount is set from the reference physical amount, wherein
   the filter processing unit performs a filter processing that attenuates or removes a frequency component of at least any one of a pitch resonance frequency, a yaw resonance frequency and a roll resonance frequency of the vehicle among waveforms of the filter target amount, and reduces a gain of the at least any one of the pitch resonance frequency, the yaw resonance frequency and the roll resonance frequency in accordance with a decrease in the vehicle speed.

2. The alternator controlling apparatus according to claim 1, wherein
   a battery charged by power generation of the alternator is mounted on the vehicle, and
   the filter processing unit prohibits or limits the filter processing based on a status of the battery.

3. The alternator controlling apparatus according to claim 2, further comprising:
   a battery voltage detecting estimating unit that detects a battery voltage of the battery, wherein
   the filter processing unit prohibits or limits the filter processing when the detected battery voltage is lower than a lower limit voltage value or higher than an upper limit voltage value.

4. The alternator controlling apparatus according to claim 3, wherein
   a driving system device mounted on the vehicle is controlled based on a plurality of control modes, and
   at least either one of the upper limit voltage value and the lower limit voltage value is changed based on the control mode.

5. The alternator controlling apparatus according to claim 4, wherein
   the filter processing unit prohibits or limits the filter processing when the vehicle speed is not higher than a lower limit vehicle speed.

6. The alternator controlling apparatus according to claim 2, wherein
   the filter processing unit prohibits or limits the filter processing when the vehicle speed is not higher than a lower limit vehicle speed.

7. The alternator controlling apparatus according to claim 3, wherein
   the filter processing unit prohibits or limits the filter processing when the vehicle speed is not higher than a lower limit vehicle speed.

8. An alternator controlling apparatus that sets a control amount based on a reference physical amount as a control reference of an alternator mounted on a vehicle and controls the alternator based on the set control amount, the alternator controlling apparatus comprising:
   a filter processing unit that performs a filter processing of a filter target amount that is any one of the reference physical amount, the control amount and a conversion physical amount used until the control amount is set from the reference physical amount,
   a battery charged by power generation of the alternator mounted on the vehicle,
   a battery voltage detecting estimating unit that detects a battery voltage of the battery,
   a driving system device mounted on the vehicle controlled based on a plurality of control modes,
   wherein
   the filter processing unit performs a filter processing that attenuates or removes a frequency component of at least any one of a pitch resonance frequency, a yaw resonance frequency and a roll resonance frequency of the vehicle among waveforms of the filter target amount, and reduces a gain of the at least any one of the pitch resonance frequency, the yaw resonance frequency and the roll resonance frequency in accordance with a decrease in the vehicle speed;
   the filter processing unit prohibits or limits the filter processing when the detected battery voltage is lower than a lower limit voltage value or higher than an upper limit voltage value;
   the control mode has at least a sports mode and an eco mode, the sports mode prioritizes torque output over improved fuel consumption, and the eco mode prioritizes improved fuel consumption over torque output, and
   the lower limit voltage value is set to be higher when the control mode is the eco mode than when the control mode is the sports mode.

9. The alternator controlling apparatus according to claim 8, wherein
   the filter processing unit reduces the gain of the at least any one of the pitch resonance frequency, the yaw resonance frequency and the roll resonance frequency in accordance with a decrease in the vehicle speed.

10. The alternator controlling apparatus according to claim 8, wherein
    the filter processing unit prohibits or limits the filter processing when the vehicle speed is not higher than a lower limit vehicle speed.

11. An alternator controlling apparatus that sets a control amount based on a reference physical amount as a control reference of an alternator mounted on a vehicle and controls the alternator based on the set control amount, the alternator controlling apparatus comprising:
  a filter processing unit that performs a filter processing of a filter target amount that is any one of the reference physical amount, the control amount and a conversion physical amount used until the control amount is set from the reference physical amount, wherein
  the filter processing unit performs a filter processing that attenuates or removes a frequency component of at least any one of a pitch resonance frequency, a yaw resonance frequency and a roll resonance frequency of the vehicle among waveforms of the filter target amount, and the filter processing unit sets a gain of the at least any one of the pitch resonance frequency, the yaw resonance frequency and the roll resonance frequency based on at least any one of a vehicle speed of the vehicle, a frictional situation of a road surface on which the vehicle travels and a steering angle speed of the vehicle;
  wherein
  the filter processing unit prohibits or limits the filter processing when the vehicle speed is not higher than a lower limit vehicle speed.

12. The alternator controlling apparatus according to claim 11, wherein
  the lower limit vehicle speed is a vehicle speed when the vehicle is in a substantially stopped state.

* * * * *